July 28, 1959　　　　E. W. CLARK　　　　2,897,447
ELECTRICAL MEASURING INSTRUMENT OF THE IRON VANE TYPE
Filed March 13, 1956　　　　　　　　　　　2 Sheets-Sheet 1

Inventor:
Earl W. Clark
by, Richard E. Horley
His Attorney

Inventor:
Earl W. Clark
by, Richard E. Horley
His Attorney

United States Patent Office 2,897,447
Patented July 28, 1959

2,897,447

ELECTRICAL MEASURING INSTRUMENT OF THE IRON VANE TYPE

Earl W. Clark, East Lynn, Mass., assignor to General Electric Company, a corporation of New York Application March 13, 1956, Serial No. 571,332

7 Claims. (Cl. 324—147)

My invention relates to an electrical measuring instrument and in particular to an electrical measuring instrument of the iron vane deflection type. My invention has particular utility in an electrical measuring instrument where high torque is a requirement as in a chart recorder having a deflectable stylus.

It is a characteristic of electrical measuring instruments of the iron vane repulsion type that crowding of the scale takes place in the lowest deflection regions thus seriously affecting the observational or recording accuracy in those regions. The crowding is further accentuated in electrical instruments having chart recording where the arc-like scale of a deflectable stylus is projected on a straight line scale of the chart. To secure improved observational accuracy in the lower deflection region, it is desirable to open up the scale in that region. It is also desirable to acquire a linear scale distribution throughout. Fundamentally, this may be accomplished by modifying the flux distribution of the magnetic field in which the vane system is operative. To achieve the desired scale distribution, it has been the practice to modify the flux distribution of the magnetic field by shaping the iron vanes and/or the field forming members. However, because of the nature of the problem and the natural laws governing the operation of repulsion and/or attraction forces in a magnetic system the members will be irregular in shape or contour. Thus, the fabrication of electrical instruments of the iron vane type with an opened up lower portion of the scale has been additionally economically costly to manufacture.

It is therefore a primary object of my invention to provide an improved electrical measuring instrument having increased observational accuracy at the lower deflection regions of the scale.

It is also an object to provide an electrical instrument having increased observational accuracy at the lower deflection region while providing for scale distribution as close to linearity as possible.

It is a further object of my invention to achieve the aforesaid objects without requiring irregularly shaped magnetic members.

It is a still further object to achieve the aforementioned objects in an electrical instrument having high torque characteristics.

In practicing my invention, I provide a radial iron repulsion type vane system adapted for operation within a magnetic field and an electromagnet adapted to generate the magnetic field in accordance with a quantity to be measured. The vane system includes a pivotally mounted movable magnetic member subjected to a magnetic torque which is a composite of complementary repelling and attraction torques causing deflection of the magnetic member in an upscale direction. In accordance with my invention I modify the flux distribution in the magnetic field to produce a magnetic attraction torque on the movable magnetic member by disposing the field forming poles of the magnetic core of the electromagnet relative to the vane system so as to form a progressively diminishing gap with the movable magnetic member. It is a particular feature of my invention that the vane system include a double armed movable vane having a central pivotal axis and that the field forming poles be disposed relative to the vane system so as to form with each arm of the movable vane a progressively diminishing gap as the magnetic vane is deflected in an upscale direction. It is a further specific feature of my invention that the poles be regularly shaped, and in particular that the poles have circular arc faces, and the progressively diminishing grap be formed by disposing the poles so that the center lines of the poles or faces be displaced on opposite sides of and parallel to a straight line transverse to the axis of rotation.

Thus, it will be seen that I have modified the flux distribution within the magnetic field in which the repulsion vane system operates so as to provide an attraction torque which is complementary to repulsion torque to open the lower deflection region of the scale. In addition, it can be seen that the degree of opening up of the scale can be affected by the degree of displacement of the magnetic poles from the transverse line through the axis of rotation. By proper degree of disposition of the poles from the straight line transverse to the pivotal axis a position can be achieved which provides a scale distribution approaching linearity.

Thus, it will be appreciated that I have provided an improved electrical measuring instrument of the iron vane deflection type which requires no special shaping of the magnetic members to produce a scale which is opened up in the lower deflection region. It will be further appreciated that this opening up can be obtained to great advantage in a high torque instrument and that a fair degree of linearity in the scale distribution may be obtained without the requirement of having provided specially shaped magnetic members having irregular contours.

The features of this invention which are believed to be novel are set forth with particularity in the appended claims. The invention itself may be better understood as to organization and construction as well as to further objects and advantages by reference to the following description taken in conjunction with the accompanying drawings in which:

Figure 1:
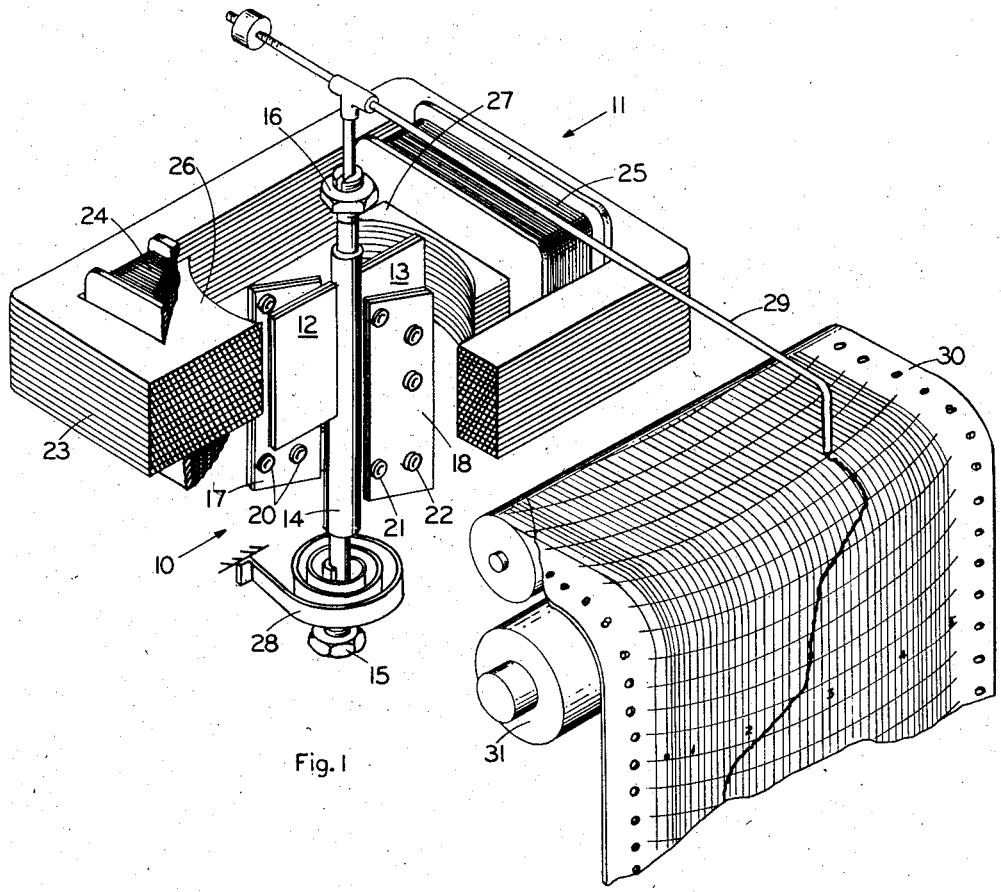
Figure 1 is a perspective view of an electrical measuring instrument incorporating my invention in combination with a chart recorder with a portion of the electromagnet cut away for clarity.
Figure 2:
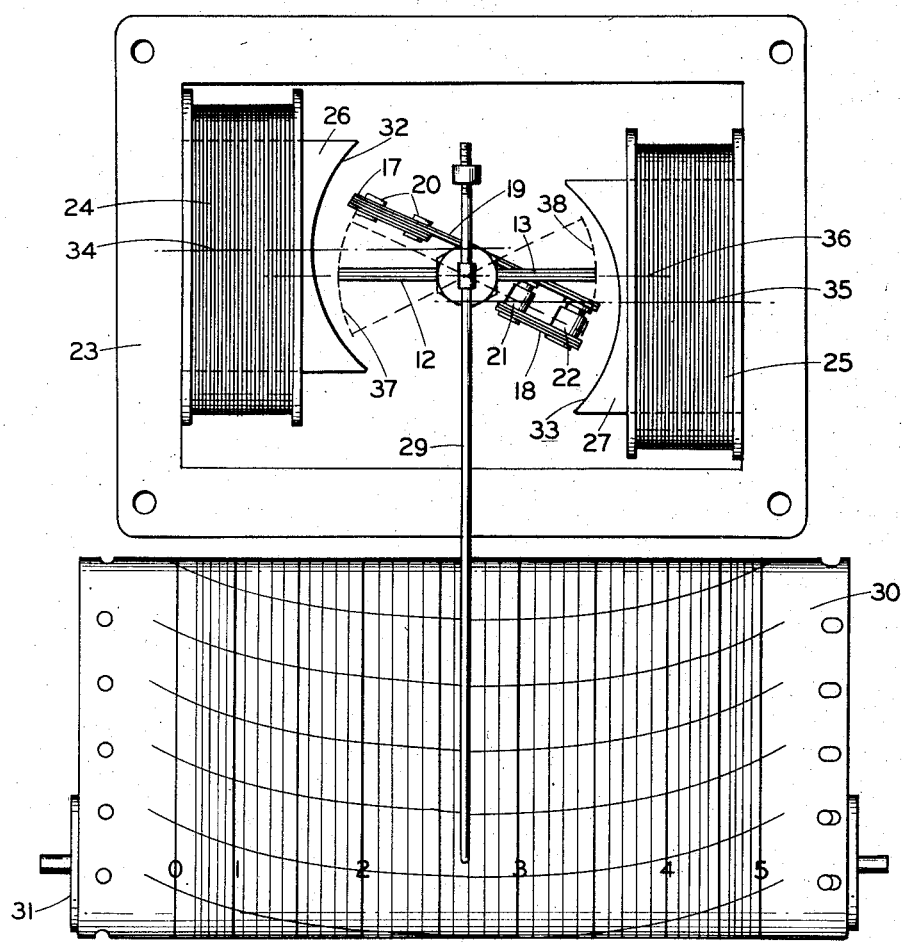
Figure 2 is a plan view of the instrument of Figure 1 illustrating the preferred embodiment of my invention in a high torque instrument with a portion of a chart to illustrate the scale distribution attained.

Referring to Figures 1 and 2 there is shown an electrical measuring instrument having a repulsion vane system 10 adapted for operation within a magnetic field generated by an electromagnet 11 in accordance with a quantity to be measured. In the form shown, the vane system comprises a movable magnetic member having rectangularly shaped arms 12 and 13 preferably formed from a single rectangular piece of suitable paramagnetic materials adapted to pass through and to be affixed to a cylindrical shaft 14 so as to extend equal distances radially therefrom and axially therealong said shaft 14 being adapted to be pivotally mounted in suitable bearing mounts 15 and 16 of any well known type and a fixed magnetic member being generally U-shaped and having axially coextending separated rectangular plate portions 17 and 18 mounted parallel to each other and to the arms 12 and 13 on opposite sides thereof and on diametrically opposite sides of shaft 14. While the U-shaped magnetic member may be fabricated as one piece, it is preferred that a cross piece 19 of paramagnetic material form the base of the U and be connected to the plate 17 by rivets 20 and to plate 18 by suitable lugs 21 and 22 of paramagnetic material. In the preferred form, cross piece 19, arms 12 and 13 and plate portions 17 and 18 are laminated so as to reduce undesirable eddy current effects.

Suitable means (not shown) may be provided which fix the position of the U-shaped member and support the movable magnetic member relative thereto and establish their position within a magnetic field. The magnetic field is generated by an electromagnet 11 comprising a magnetic core 23, preferably laminated, wound with flux producing current responsive means 24 and 25. In the form shown, the magnetic core is generally rectangular in shape having a central opening into which a pair of magnetic poles 26 and 27 extend to form a magnetic field in which the vane system is positioned. The windings 24 and 25 are formed of a suitable number of turns of electrical conductor wound on a suitable coil form of insulating material which is preferably shaped for mounting on the magnetic poles. In the preferred form the magnetic poles 26 and 27 are formed as integral portions of the laminations; however, the magnetic poles may be separate pole pieces which are attachable either fixedly or adjustably to the core in some well known manner. Conductor leads (not shown) are provided for connecting the windings to each other and/or a suitable electrical circuit to be energized. The windings, whether connected in parallel or series are energizable so as to magnetize the poles 26 and 27 to opposite polarities. In accordance with well known principles of electromagnetism, a directional magnetic field is produced between the poles 26 and 27 of an intensity commensurate with the magnitude of the current in the windings which magnetically polarizes the movable and U-shaped magnetic members in the vane system with a like polarity whereupon repulsion forces between arms 12 and 13 and corresponding juxtaposed plates 17 and 18 cause a deflecting torque tending to rotate the shaft 28 in an upscale direction. Countertorque means in the form of a spiral spring 28 is fixed to shaft 14 in any well known manner tending to resist turning thereof in an upscale direction. An indicator, in the form of a stylus 29 is fixedly connected to an end of shaft 14 so as to be perpendicular to the plane of arms 12 and 13 of the movable magnetic member for movement therewith in accordance with magnitude of the torque exerted on the movable magnetic member. A chart 30 having a calibrated scale printed thereon is provided which is movable at a predetermined rate in accordance with a suitable drive mechanism including a platen 31 and upon which the stylus 30 makes a record in accordance with the deflection of the movable magnetic member.

In accordance with my invention I open the lower region of the scale by disposing the magnetic poles 26 and 27 of core 23 relative to the vane system so as to form progressively diminishing gaps with the arms 12 and 13 of the movable magnetic member. As best seen in Figure 2, the poles 26 and 27, preferably having circular arc faces 32 and 33, are disposed so that their respective center lines or perpendicular bisectors 34 and 35 are on opposite sides and parallel to a straight line 36 drawn transverse to the central axis of shaft 14. It is apparent that the bisectors of the surfaces of the pole faces 32 and 33 will be planes which will not pass through the shaft 14 or the pivotal axis but will be displaced therefrom a distance corresponding to the amounts of displacement in a perpendicular direction of the poles relative to the reference line 36. It is easily seen that as movable magnetic member swings about its pivoted axis with shaft 14, the ends thereof describe arcs shown by dotted lines 37 and 38 which illustrate graphically the progressively diminishing gaps between the ends of arms 12 and 13 respectively and the faces of magnetic poles 32 and 33.

Figure 3:
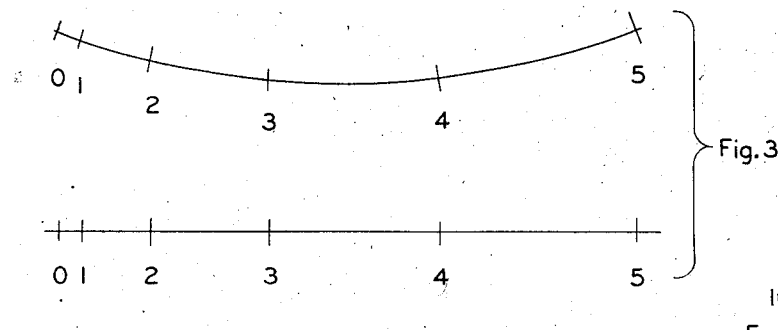
Figure 3 is a showing of a square law scale and its straight line projection illustrating the crowded distribution in the lower deflection region.

Figure 3 shows a square law scale distribution and its straight line projection each drawn to the dimensions of the scale of chart 30 in Figure 2. By way of comparison it will be seen that there is substantial crowding in the lower deflection region of the square law scale and the straight line projection thereof whereas the scale of chart 30 is markedly opened up in the lower deflection region covering approximately one third with an opening up occurring to as much as two thirds of full scale. It is understood, of course, that greater or lesser proportions of full scale may be opened up in accordance with varying displacements of magnetic poles 26 and 27 from straight line 36. By way of illustration and not of limitation and in accordance with my invention the scale distribution of chart 30 was obtained where magnetic core 11 was designed to have magnetic poles 26 and 27 1.750 inches wide with circular arc faces 32 and 33 cut at a radius of 1.150 inches taken from the points of intersection of the center lines 34 and 35 of the poles and a line perpendicular thereto and equidistant from the pole faces. The fixed magnetic vane member and the movable magnetic members had overall lengths of 2.146 inches and 2.030 inches respectively. The fixed magnetic member was positioned at an angle of 23° 54″ relative to straight line 36 with the movable magnetic member set to be rotatable through a sweep angle of 41°. The center lines 34 and 35 were then offset from line 36 by 0.121 inch. It is to be understood that other specifications may be used to get like results with the magnitude of displacement of poles 26 and 27 controlling the rate of diminution of the air gaps to affect the opening up of the lower region of the scale to varying degrees.

In the operation of the electrical instrument incorporating disposed magnetic poles 26 and 27 to form progressively diminishing air gaps, a current is passed through windings 24 and 25 to energize electromagnet 11 in accordance with the magnitude of the current thereby generating a magnetic field between poles 26 and 27 magnetically polarizing the vane system 10 so that plates 17 and 18 assume a polarity like arms 12 and 13 respectively. Repulsion forces between the respective elements of vane system 10 exert a magnetic torque on the movable magnetic member causing it to rotate on pivotal shaft 14 in an upscale direction against opposition of spiral spring 28 which tends to rotate it in the downscale direction. Because of the movement of the arms 12 and 13 about the pivotal axis of rotation, the radially extending edges thereof move closer to the faces 32 and 33 of magnetic poles 26 and 27 reducing the gaps therebetween so as to reduce the magnetic reluctance thereby exerting an attraction torque on the arms 12 and 13. Since the diminution of the gaps takes place when the movable magnetic member moves upscale, the attraction torque will act to further increase the amount of upscale movement thereby being complementary to the repulsion torque and resulting in a deflection greater than acquired from the repulsion torque acting alone.

While the detailed description pertains to the double arm vane embodiment and circular arc pole faces, it is to be understood that a single arm vane structure and/or regularly shaped poles having other contours will also give like results as to scale distribution and that the operation will be explainable in a like manner where a single progressively diminishing gap is provided.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. An electrical measuring instrument comprising a repulsion vane system adapted for operation within a magnetic field and including a fixed vane and a radially extending magnetic vane member movable about a pivotal axis within said field in accordance with a magnetic torque exerted thereon, and an electromagnet adapted to generate a magnetic field in which said system is operable, said electromagnet comprising a magnetic core having field forming poles, said poles being disposed relative to said vane system such as to be non-concentric and surrounding the path described by the edge of said movable vane remote from said axis upon the generation of said magnetic field so that the said poles form with said movable magnetic member a progressively diminishing gap therebetween in a radial direction as said member is deflected in an upscale direction whereby a magnetic attraction torque acts upon said movable member during energization of said electromagnet.

2. An electrical measuring instrument comprising a repulsion vane system adapted for operation within a magnetic field and including a magnetic member movable about a pivotal axis within said field in accordance with a magnetic torque exerted thereon, said magnetic member comprising at least one vane radially extending from said pivotal axis, a fixed vane associated with said movable vane for developing magnetic torque therebetween, and an electromagnet adapted to generate a magnetic field in which said system is operable, said electromagnet comprising a magnetic core having field forming poles having faces positioned around and spaced from the said movable member, said poles being disposed relative to said vane system so that at least one of said pole faces forms with the edge of said movable magnetic member remote from said axis a progressively diminishing gap therebetween in a radial direction as said member is deflected whereby a magnetic attraction torque acts upon said movable member during energization of said electromagnet.

3. An electrical measuring instrument comprising a repulsion vane system adapted for operation within a magnetic field and including a magnetic member movable about a pivotal axis within said field in accordance with a magnetic torque exerted thereon, and an electromagnet adapted to generate a magnetic field in which said system is operable, said electromagnet comprising a magnetic core having field forming poles partially surrounding and spaced from the path described by the edges of said movable member remote from said pivotal axis and forming a single regular curved surface, said poles being disposed so that the perpendicular bisectors of said curved surfaces are on opposite sides of said pivotal axis, said regular curved surfaces being equidistant from lines parallel to said pivotal axis and displaced therefrom, said poles thereby forming with said movable member a progressively diminishing gap therebetween in a radial direction as said member is deflected whereby a magnetic attraction torque acts upon said movable member during energization of said electromagnet.

4. An electrical measuring instrument comprising a repulsion vane system adapted for operation within a magnetic field and including a fixed member and a magnetic member movable about a pivotal axis within said field in accordance with a magnetic force developed therebetween, and an electromagnet adapted to generate a magnetic field in which said system is operable, said electromagnet comprising a magnetic core having field forming poles, said poles forming curved surfaces surrounding a portion of the path described by the edges of said movable member and being disposed such that the perpendicular bisectors of said curved surfaces are disposed on opposite sides of said pivotal axis, at least one of said poles thereby cooperating with said member to form a progressively diminishing gap therebetween in a radial direction as said member is deflected whereby a magnetic attraction torque acts upon said movable member during energization of said electromagnet.

5. An electrical measuring instrument comprising a repulsion vane system adapted for operation within a magnetic field and including a double armed magnetic member rotatable about a pivotal axis within said field in accordance with a magnetic torque exerted thereon, each of said double arms extending in radial directions from said pivotal axis, and an electromagnet adapted to generate a magnetic field in which said system is operable, said electromagnet comprising a magnetic core having field forming poles, said poles being disposed relative to said vane system so as to form with each arm of said magnetic member progressively diminishing gaps therebetween in a radial direction as said magnetic member is deflected whereby a magnetic attraction torque acts upon said movable member during energization of said electromagnet.

6. An electrical measuring instrument as in claim 5 in which said pole pieces are shaped so as to form regular curved surfaces positioned such that their perpendicular bisectors are on opposite sides of said pivotal axis, and said arms extend in diametrically opposite directions from said pivotal axis.

7. An electrical measuring instrument comprising a pivotally mounted shaft having a fixed axis of rotation, a movable magnetic vane member fixed to said shaft for rotation therewith in accordance with a magnetic torque exerted thereon, said movable magnetic vane member having portions extending radially from said shaft in diametrically opposed directions and having edges extending parallel to said shaft axis, a fixed magnetic member symmetrically arranged about said shaft having separate portions disposed on opposite sides of said portions of said movable members, said fixed and said movable members being adapted for magnetization to a like polarity whereby a repulsion torque causes rotation of said movable vane on said shaft, countertorque means fixed to said shaft adapted to oppose turning moments thereon, and an electromagnet comprising a magnetic core having flux producing current responsive means wound thereon, said electromagnet positioned such that the flux produced links both said fixed member and said movable member, said magnetic core having oppositely disposed magnetic poles having faces disposed around the path described by said movable member so as to form regular curved surfaces, the perpendicular bisectors of which lie on opposite sides of said axis of rotation, said curved surfaces being equidistant from lines parallel to said pivotal axis and spaced therefrom, said pole faces thereby forming a progressively diminishing gap therebetween in a radial direction with said edges of each of said portions of said movable magnetic vane as said movable magnetic vane portions are deflected whereby a magnetic attraction torque acts upon said movable magnetic vane complementary to said repulsion couple during energization of said electromagnet.

References Cited in the file of this patent

UNITED STATES PATENTS

| | | |
|---|---|---|
| 2,015,474 | Hartley | Sept. 24, 1935 |
| 2,183,566 | Hoare | Dec. 19, 1939 |
| 2,610,989 | Wiese | Sept. 16, 1952 |
| 2,734,108 | Huber | Feb. 7, 1956 |

FOREIGN PATENTS

| | | |
|---|---|---|
| 482,124 | Great Britain | Mar. 22, 1938 |